Patented Apr. 28, 1931

1,802,468

UNITED STATES PATENT OFFICE

CHING TSANG HO, OF PASSAIC, NEW JERSEY, ASSIGNOR TO ERIC C. KUNZ, OF MONTCLAIR, NEW JERSEY

PROCESS OF MAKING ALCOHOLS FROM ALDEHYDES

No Drawing.   Application filed November 4, 1926.   Serial No. 146,286.

My invention relates to processes for the conversion of aldehydes into alcohols, and particularly for the conversion of the aldehydes of the more complex constitution, such as the aromatic and aliphatic aldehydes, of either the open or closed chain formulæ, either saturated or unsaturated into the corresponding alcohol.

There are a number of naturally occurring aldehydes, such as, for instance, those of the essential oils of citronella, cassia and lemon grass, which essential oils are largely composed of complex natural aldehydes. For many purposes, however, it is desirable that the corresponding alcohol be obtained instead of the aldehyde. There is, however, no convenient natural source of supply to provide such alcohols. In the past they have been obtainable only with difficulty. My invention provides a process for producing the alcohol from the naturally occurring aldehyde, of which there is a relatively plentiful supply.

It has been known in the prior art that absolute ethyl alcohol will react with aluminum amalgam to produce an ethyl-aluminate, with the evolution of hydrogen gas. This product has been used for combination with other halogen substituted products for the production of addition reactions, under an appropriate name. It is a liquid which has substantial solvent powers and will dissolve, or mix with, many other substances, and it is a particular satisfactory medium for the carrying on of certain reactions. The combination between the alcohol and the aluminum produces nascent hydrogen, which is particularly adapted to certain reduction reactions. The hydrogen evolved by this reaction is particularly well adapted to the reduction of compounds such as the aldehydes, and the reduction pressure is such that the reduction proceeds only to the stage of an alcohol.

By my invention, I find that it is possible to begin the formation of an alcohol aluminate and to add to the reaction mixture additional alcohol, the aldehyde to be reduced, and additional aluminum. Hydrogen is liberated by combination between the alcohol and the aluminum at a speed which is conveniently high, but not high enough to endanger the contents of the container. The aldehyde is readily reduced by the liberated hydrogen to the corresponding alcohol without other change in the structural constitution, and without troublesome side reactions, and the reaction proceeds smoothly and easily upon gentle heating.

I have further found that it is not necessary that absolute ethyl alcohol be used as the solvent, but that absolute normal butyl alcohol, isoamyl alcohol, propyl alcohol, benzyl alcohol and similar alcohols may be substituted for the absolute ethyl alcohol, and may be caused to react with aluminum, as before, either in the presence of traces of mercury chloride or of an aluminum amalgam.

In the operation of my process I find it convenient to start with any desired one of the enumerated alcohols, add to it the aluminum and mercury chloride or aluminum in the form of an amalgam, and start the reaction between the aluminum and alcohol by gentle heating. At the proper stage I then add additional aluminum and the aldehyde which I desire to convert to the alcohol, mixed with more of the solvent alcohol, continuing the warming to facilitate the reaction. At the close of the reaction the mixture may be diluted with water to precipitate the aluminum as the hydroxide. This may be removed by appropriate means, and the various products separated by suitable means, such, for instance, as distillation.

I have found that the reaction as above described proceeds smoothly and readily for the conversion of pure aldehydes into the corresponding alcohols. I have also found that it is not necessary that the aldehydes be in pure form, but that mixtures, either of various aldehydes or of aldehyde and other products, will react equally well. That is, I find that the presence of the terpenes, as in the case of the natural oils of citronella, cassia and lemon grass do not interfere with the reduction reaction. In consequence, when the natural oils are used as the source of the aldehydes, the resulting product is a mixture of the desired alcohol, with the original terpenes. These may be recovered from the reaction mixture, together, or may, if desired, be separated by appropriate means.

A representative example of the process of my invention is embodied in the following description: For apparatus I preferably use a round bottom flask provided with a stirring rod and a reflux condenser. In it I place 200 parts of absolute alcohol which may desirably be water-free normal butyl alcohol, three parts of aluminum metal in finely divided form, such as shavings, and one or two parts of aluminum amalgam (the aluminum amalgam may be replaced by trace of mercuric chloride). This mixture is then heated gently, as on a water bath, until the reaction is well started. The heating may be continued until the aluminum is completely dissolved without detriment. Into this solution a mixture of 100 parts of citronellal and 200 parts of absolute normal butyl alcohol are added slowly and with constant stirring. At the same time 12 parts of aluminum, such as shavings, are added in small portions. The reaction mixture is then maintained at a temperature of 50° to 80° C. until the reaction is complete, which may be in from three to six hours. When the reaction is completed the mixture is allowed to cool and is diluted with 200 parts of water. This precipitates the aluminum as hydroxide. The aluminum hydroxide may then be re-dissolved by the addition of dilute acid, such as sulphuric acid, cooling, if necessary, to prevent an undue rise in temperature. The addition of the water causes the mixture to separate into layers, one layer being watery in composition and the other containing the alcohols. The two layers may be separated, as in a separatory funnel. The alcoholic layer may then be distilled in vaccuo to separate the normal butyl alcohol from the desired citronellol. The yield from this procedure is customarily from 80 to 85% of the theoretical.

The reactions occurring in the mixture in the above described embodiment of the process, may be represented by the following formulæ.

$$3CH_3CH_2CH_2CH_2OH + Al \rightarrow Al(CH_3CH_2CH_2CH_2O)_3 + 3H$$
Normal butyl alcohol                 Butyl aluminate

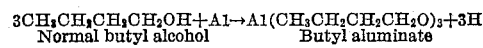

or

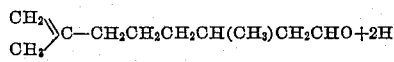

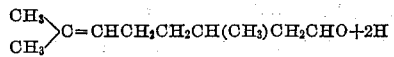

or

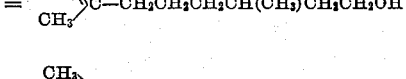

A second example of an embodiment of my process may be described as follows: The flask, stirrer, and condenser are provided as before, the 200 parts of absolute normal butyl alcohol, three parts of aluminum metal and the necessary mercury catalyst are placed in it, and the mixture heated to start the reaction. 100 parts of cinnamic aldehyde, mixed with 200 parts of absolute normal butyl alcohol, may then be stirred in as before, and 14 parts of aluminum metal, as in the form of shavings, added in small portions during the addition of the cinnamic aldehyde and alcohol mixture. The heating may be continued as before until the reaction is completed, whereupon the aluminum may be thrown out by dilution with water, re-dissolved by the addition of diluted acid and the alcoholic layer separated and fractionated in vaccuo as before. The yield may be 70 to 75% of the theoretical, and a small portion of saponified material may be produced, probably in the form of esters.

The reaction occurring in the above described example is closely similar to that in the first described example. The essential difference is indicated by the following formula, showing the same reaction with a benzol derivative:

$$C_6H_5CH=CHCHO + 2H \rightarrow C_6H_5CH=CHCH_2OH$$

The hydrogen being furnished as before by the reaction between the alcohol and the aluminum.

I find that it is not essential that the alcohol aluminate be prepared first, with the reduction of the aldehyde as a successive step, but that the two reactions may take place substantially simultaneously.

As a third example of an embodiment of my process, I may place in a flask, provided as before with stirrer, and reflux condenser, 600 parts of absolute normal butyl alcohol, 400 parts of water-free oil of citronella "Java", which contains geraniol, and 5 parts of aluminum metal in the form of shavings, with the mercury catalyst as before. This mixture is heated gently on the water bath and stirred until the reaction is well started, with the temperature maintained at from 50° to 80° C. 18 to 20 parts of aluminum metal, as in the form of shavings, are then added in small portions from time to time. The reaction proceeds to completion in from three to six hours. The reaction mixture is then cooled and diluted with 500 parts of water, throwing down the aluminum in the form of hydroxide. This is re-dissolved by the addition of dilute sulphuric acid until the solution is slightly acid. The alcoholic layer may then be separated as before, washed with additional water, if desired, and then fractionated in vaccuo for the separation of the desired aldehyde. The customary yield is about 75% of the theoretical. The desired material, a mixture of geraniol and citronellol, distills at a temperature between 110° and 115° C. at 15 mm. pressure, and when so prepared and distilled may contain a few percent of saponified matter, probably in the form of esters.

While I have described but three embodiments of the process of my invention it is capable of various modifications therefrom without departing from the spirit thereof, and it is desired, therefore, that only such limitations shall be imposed thereon as are required by the prior art or indicated by the appended claims.

I claim as my invention:

1. The sequence of steps in the process of producing an alcohol, which comprises forming an alcoholic aluminate of another alcohol, dissolving therein an aldehyde, reducing the aldehyde by means of additional metallic aluminum and a hydrogen supplying substance, diluting with water, separating the mixture of the first mentioned alcohol and the desired alcohol, and fractionating the mixture in vaccuo and recovering the desired alcohol by selective distillation.

2. The process of producing citronellol, which comprises mixing normal butyl alcohol, oil of citronella, metallic aluminum, and a catalyst, heating the mixture to start and maintain the reaction, adding additional aluminum at intervals, completing the reaction, cooling, diluting with water, neutralizing with acid, separating the alcoholic layer, fractionating in vaccuo, and collecting the citronellol.

3. The process of producing a mixture of citronellol and geraniol, which comprises mixing normal butyl alcohol, oil of citronella, metallic aluminum, and a catalyst, heating the mixture to start and maintain the reaction, adding additional aluminum at intervals, completing the reaction, cooling, diluting with water, neutralizing with acid, separating the alcoholic layer, fractionating in vaccuo, and collecting the portion boiling between 110° C. and 115° C. at 15 mm. pressure.

In witness whereof I hereunto subscribe my signature.

CHING TSANG HO.